US009194486B2

(12) United States Patent
Rogner et al.

(10) Patent No.: US 9,194,486 B2
(45) Date of Patent: Nov. 24, 2015

(54) METHOD AND DEVICE FOR ACTUATING A SHIFT ELEMENT OF AN AUTOMATIC TRANSMISSION HAVING A START-STOP MEANS

(71) Applicant: ZF Friedrichshafen AG, Friedrichshafen (DE)

(72) Inventors: Horst Rogner, Oberteuringen (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/656,799

(22) Filed: Mar. 13, 2015

(65) Prior Publication Data
US 2015/0184739 A1    Jul. 2, 2015

Related U.S. Application Data

(62) Division of application No. 13/361,094, filed on Jan. 30, 2012.

(30) Foreign Application Priority Data

Feb. 21, 2011    (DE) .......................... 10 2011 004 467

(51) Int. Cl.
*F02N 11/08*    (2006.01)
*F16D 48/02*    (2006.01)
(Continued)

(52) U.S. Cl.
CPC ............ *F16H 61/0025* (2013.01); *F02N 11/08* (2013.01); *F16D 25/0638* (2013.01);
(Continued)

(58) Field of Classification Search
CPC ............ F16D 2500/50883; F16D 2048/0284; F16D 2500/70424; F16H 2312/14; F16H 2063/303

USPC .......................................... 192/82.25, 85.38
See application file for complete search history.

(56) References Cited

U.S. PATENT DOCUMENTS 3,105,582 A * 10/1963 Ziabicki ................... 192/113.35
5,887,690 A    3/1999 Haupt
(Continued)

FOREIGN PATENT DOCUMENTS

DE    199 32 614 A1    1/2001
DE    101 31 816 A1    1/2003
(Continued)

OTHER PUBLICATIONS

German Search Report Corresponding to 10 2011 004 467.1 mailed Feb. 9, 2012.

*Primary Examiner* — Robert A Siconolfi
*Assistant Examiner* — Terry Chau
(74) *Attorney, Agent, or Firm* — Davis & Bujold, P.L.L.C.; Michael J. Bujold

(57) ABSTRACT

A method for actuating a shift element of an automatic transmission having a start-stop function and a pressure medium pump driven by an internal combustion engine. The shifting elements are clutches or brakes that can be actuated by a piston which is actuated for engagement via pressure supplied to a pressure space. The pressure space is depressurized when the engine stops. To enhance start-stop operation, the shifting elements comprise an additional pressure space that acts, in opposition to the pressure space acting in the engaging direction, as a controllable restoring mechanism which can be rendered inactive, if desired. If the engine stops and the automatic start-stop function is activated, the additional pressure spaces, acting in the restoring direction, are depressurized before the pressure drop in the pressure spaces, acting in the engaging direction, of the pistons, but are otherwise permanently pressurized during driving operation.

6 Claims, 1 Drawing Sheet

(51) Int. Cl.
  *F16H 61/00* (2006.01)
  *F16H 61/16* (2006.01)
  *F16D 25/0638* (2006.01)
  *F16D 48/06* (2006.01)
  *F16H 61/30* (2006.01)
  *F16H 63/30* (2006.01)

(52) U.S. Cl.
  CPC .............. *F16D48/066* (2013.01); *F16H 61/16* (2013.01); *F16H 61/30* (2013.01); *F16H 63/3026* (2013.01); *F16D 2048/0284* (2013.01); *F16D 2500/50883* (2013.01); *F16D 2500/70424* (2013.01); *F16H 2061/0034* (2013.01); *F16H 2063/303* (2013.01); *F16H 2312/022* (2013.01); *F16H 2312/14* (2013.01); *Y10T 477/75* (2015.01); *Y10T 477/813* (2015.01)

(56) References Cited

U.S. PATENT DOCUMENTS

| | | | |
|---|---|---|---|
| 6,595,339 B1 | 7/2003 | Bauknecht et al. | |
| 6,684,995 B1 | 2/2004 | Page | |
| 6,968,935 B2 | 11/2005 | Biermann et al. | |
| 7,293,637 B2 | 11/2007 | Janson et al. | |
| 7,487,865 B2 | 2/2009 | Stevenson | |
| 8,088,040 B2 | 1/2012 | Schiele et al. | |
| 8,858,394 B2* | 10/2014 | Nogle | 477/115 |
| 2006/0042904 A1 | 3/2006 | De Maziere | |
| 2007/0256907 A1 | 11/2007 | Gremplini et al. | |
| 2008/0064547 A1 | 3/2008 | Schiele et al. | |
| 2008/0293544 A1* | 11/2008 | Schiele et al. | 477/164 |

FOREIGN PATENT DOCUMENTS

| | | |
|---|---|---|
| DE | 10 2006 012 838 A1 | 11/2006 |
| DE | 10 2006 014 759 A1 | 10/2007 |
| DE | 10 2006 041 900 A1 | 3/2008 |
| DE | 10 2007 003 924 A1 | 7/2008 |
| DE | 10 2007 003 922 A1 | 10/2008 |
| DE | 10 2007 023 956 A1 | 11/2008 |
| DE | 10 2009 055 063 A1 | 6/2011 |
| DE | 10 2010 002 747 A1 | 9/2011 |
| WO | 2007/118500 A1 | 10/2007 |

* cited by examiner

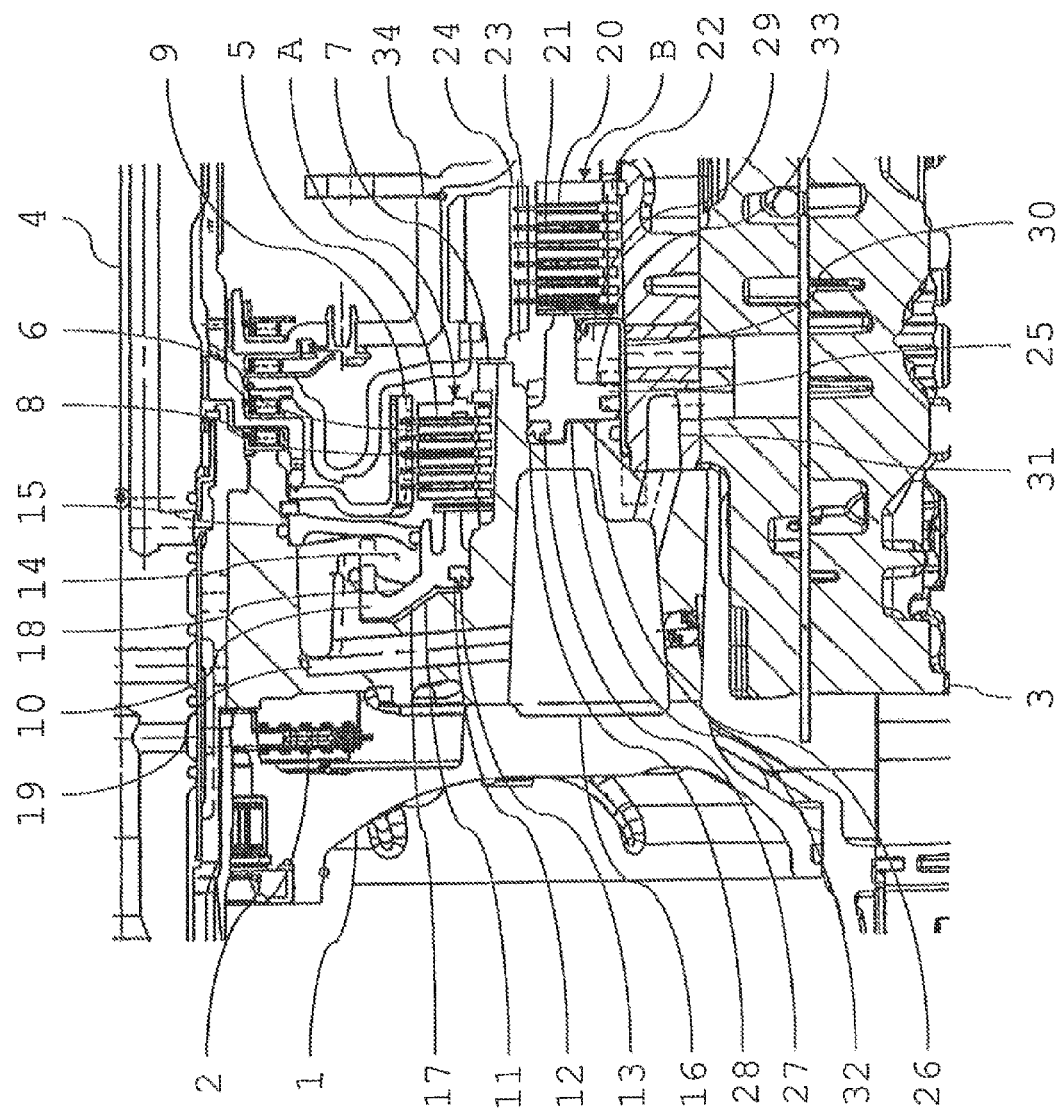

METHOD AND DEVICE FOR ACTUATING A SHIFT ELEMENT OF AN AUTOMATIC TRANSMISSION HAVING A START-STOP MEANS

This application is a divisional of U.S. patent application Ser. No. 13/361,094 filed Jan. 30, 2012, which claims priority from German patent application serial no. 10 2011 004 467.1 filed Feb. 21, 2011.

FIELD OF THE INVENTION

The invention concerns a method and a device for actuating shifting elements of an automatic transmission having a start-stop means.

BACKGROUND OF THE INVENTION

To reduce fuel consumption, harmful emissions and noise levels in vehicular traffic, start-stop systems, by means of which the internal combustion engine is automatically switched off when the vehicle is at rest and automatically re-started when a wish to begin moving again is recognized, are becoming increasingly important. In order to enable this function in the case of an automatic transmission in which a hydraulic pump is driven by the internal combustion engine to supply pressure and cooling oil to the shifting clutches and shifting brakes of the transmission, the shifting clutches or shifting brakes required for a starting gear must already be at their contact point or even engaged when the internal combustion engine is stopped, or at least at a time close to the re-starting of the internal combustion engine. In this way it can be ensured that the conventional hydraulic pump is able, during an engine start that takes only a short time so that then only a small volume of hydraulic fluid is needed, to produce a sufficient oil pressure for quick torque transmission at the shifting elements. However, according to the prior art the shifting pistons of the shifting elements, which are usually mechanically spring-loaded in the disengagement direction, move to the disengaged position as soon as the hydraulic pressure falls when the motor and pump stop. With the consequently produced air-gap clearance, it is true that any non-actuated disk packets can move in consort, with low drag torques, but bridging the no-load stroke distance and the associated quantity of pressure fluid demanded before torque transmission in the starting gear can begin, results in a perceptible delay in starting which impairs the comfort of the start-stop operation.

From DE 10 2006 012 838 A1 for example, it is known, when the engine stops, to drive an electric auxiliary pump having a permanent power uptake, which at least maintains a hydraulic supply pressure for the shifting elements involved in starting. Furthermore, from WO 2007/118 500 A1 it is known to use additionally incorporated impulse storage devices which are charged with fluid during driving operation and, when the engine is re-started, ejecting this fluid charge into the hydraulic system to assist a rapid pressure build-up by the hydraulic pump. In addition, from DE 10 2006 014 759 A1 a hydraulic control device is known, by means of which the shifting elements that are relevant for a start-stop function are prevented from disengaging when the engine is off by one-way valves which restrict the back-flow of hydraulic fluid.

DE 199 32 614 A1 describes a hydraulically actuated piston for engaging and disengaging a disk clutch of a variable-speed automatic transmission. Associated with the clutch piston is a diaphragm plate which, together with the piston, forms an additional pressure space that acts in opposition to a piston space. When the pressure in the two pressure spaces is the same, the resultant pressure force depends only on the difference between the two pressure surface areas. Thus, by controlling the piston area difference, different shifting moments compared with the effect of the entire piston surface can be produced. In particular, with clutches which, as such, have to produce high static holding torques in shifting processes which only require a low torque, such as in shifts during coasting, low shifting torques can be achieved by means of the piston area difference, which attenuate comfort-impairing shift jerks.

DE 101 31 816 A1 discloses an assembly of two disk brakes. Each of the two disk brakes has a pressure space in which a piston is acted upon by a hydraulic fluid which, for its part, actuates a secondary piston and the secondary piston in turn acts upon a disk packet of the disk brakes. On the rear side of the secondary piston extended radially outward is arranged in each case a second pressure space radially above the disk packet, i.e. on a diameter larger than that of the disk packet. The second pressure spaces have in each case a fluid inlet through which they can be acted upon by a hydraulic fluid under pressure in order to push back the respective secondary piston and with it the main piston, whereby the first pressure space is emptied. The second pressure spaces can be actively controlled by electro-hydraulic or electro-pneumatic pressure modulation as regulated restoring means. The engagement and disengagement of the disk brakes can in each case take place by controlling the pressure difference in the two pressure spaces in order to achieve sensitive shifting with small and very different shifting moments.

DE 10 2007 003 922 A1 describes a clutch piston of a rotating disk clutch in an automatic transmission of a motor vehicle, in which a pressure compensation space is designed to form a dynamic restoring means. The pressure compensation space compensates for the displacement forces on the piston the are usually produced by oil rotating in a piston space due to centrifugal force, and in addition produces a resultant restoring force that replaces a conventional spring. In contrast to a restoring spring, however, the restoring force of the pressure compensation space only acts on the piston when the clutch is rotating. If the drive motor stops, so too does rotation of the piston. Consequently, despite the falling hydraulic pressure the piston remains in a forward end position since there is no longer a restoring force, i.e. it is nearly in the engaged position. Then, when the engine is re-started, only a small oil volume has to be replaced, whereby the necessary shifting pressure for a starting process in start-stop operation is provided in an acceptably short time.

SUMMARY OF THE INVENTION

Against this background the purpose of the present invention is to indicate a method and a device for the control of shifting elements in an automatic transmission, which enable comfortable and efficient start-stop operation with little structural cost and little control effort, and which can be produced inexpensively.

The invention is based on the recognition that in an automatic transmission with hydraulically actuated shifting elements, a rear pressure space can be used as restoring means for the shifting piston concerned, which during normal driving operation performs by the action of pressure, the function of a conventional restoring spring and which can be deactivated when the engine is shut off during start-stop operation in order to leave the piston in its previous position on the associated transmission element of the shifting element, for example a disk packet. In this way, when the engine stops during a start-stop operation the complete disengagement of the previously engaged shifting element required for a starting process should be prevented because of the pressure drop of the transmission oil pump coupled to the engine, in order to enable delay-free starting by rapid restoration of the torque transmission, when the engine is re-started.

Accordingly, the invention starts with a method for controlling shifting elements of an automatic transmission with an automatic start-stop function and in which a pump for supplying the transmission with pressure medium is driven by an internal combustion engine, wherein the shifting elements, in the form of shifting clutches or shifting brakes, can in each case be actuated by an axially moving piston, in which the piston can be acted upon in the disengagement direction with pressure in a pressure space, and in which the pressure space acting in the engaging direction of the piston is depressurized when the engine stops.

To achieve the set objective in relation to method, the invention provides that at least in the case of all the shifting elements involved in starting processes, there is an additional pressure space designed as a restoring means which acts in opposition to the pressure space acting in the engagement direction, and which when the engine stops while the automatic start-stop function has been activated, is depressurized before the pressure drop in the pressure space that acts in the engaging direction of the piston, but which is otherwise permanently pressurized during driving operation.

In addition, the invention starts from a device for controlling shifting elements of an automatic transmission with an automatic start-stop function, in which a pump for supplying the transmission with pressure medium can be driven by an internal combustion engine, wherein the shifting elements are in the form of shifting clutches or shifting brakes, in which the shifting elements can in each case be actuated by an axially movable piston, and in which the piston can be acted upon in the engaging direction by the pressure in a pressure space.

To achieve the stated objective in terms of the device, the invention provides that at least in the case of all the shifting elements involved in starting processes, an additional pressure space acting in opposition to the pressure space which acts in the engaging direction is provided, which is designed as a controllable restoring means which can be disconnected when necessary, such that the two pressure spaces have functional surface areas whose ratio is chosen so that when pressurized at the same time, the force actuating the shifting element in its engagement direction predominates.

An automatic transmission is understood in particular to mean an automatic transmission of planetary design. Basically, however, the invention is also suitable for semi-automatic transmissions of planetary or countershaft design. A piston is understood to mean an actuating element for actuating a shifting clutch or shifting brake in such a transmission.

The arrangement according to the invention can be used both with fixed shifting brakes and with rotating shifting clutches, so that in contrast to arrangements with leak-prone non-return valves, no different devices or control means for brakes and clutches in a transmission are needed. This applies regardless of whether the shifting brakes and/or shifting clutches are involved in a starting process. Furthermore, with a design according to the invention conventional restoring springs can be omitted. In the case of rotating clutches the effects of displacement forces on the piston, produced by centrifugal force in the rotating fluid, may have to be taken into account. Compared with impulse storage devices the structural complexity is less. Compared with electric auxiliary pumps, besides the lesser structural complexity, there is no need for power uptake from an electrical energy accumulator when the engine has stopped, which reduces the efficiency of start-stop operation.

The additional pressure spaces for piston restoration can be formed by hydraulically sealing off a suitable rear space of the piston. This can be done simply and inexpensively, for example by using already existing free spaces or pressure compensation spaces or by adapting these in such manner that when the two pressure spaces opposite one another are hydraulically pressurized at the same time, the force for actuating the shifting element predominates at a suitable level so that the torque transmission for the corresponding driving gear is ensured. Instead of a no longer needed cup spring for spring-loading the piston in its disengagement direction, a hydraulically leak proof diaphragm plate can be arranged so as to delimit and seal the additional pressure space.

Furthermore, it can be provided that the additional pressure spaces for piston restoration are hydraulically connected to one another. In relation to the hydraulic transmission control system this enables just one common control line to be used for restoring a plurality of pistons. The line branching and delivery to the respective shifting pistons can then be formed in a space-saving and cost-saving manner, close to the pressure spaces.

Accordingly, in a preferred embodiment of the invention the shifting elements required for starting each comprise two axially opposite pressure spaces acting in opposition, such that the pressure spaces of the pistons concerned that act against the engaging direction are connected fluidically to one another and are permanently pressurized during normal driving operation. In this way, in any driving situation, analogously to the working mode of restoring springs the usual function of the shifting element, including its venting when disengaged, is retained unchanged. Only when the start-stop function is activated are the relevant pressure spaces for restoration depressurized at a time earlier than the pressure spaces for actuating the shifting element. In this way the actuating pistons concerned remain in a contact, or at least nearly contact position relative to the disk packet of the shifting element, since the restoring force in the disengagement direction has been eliminated at the proper time.

Thus, during the re-starting of the vehicle's engine, the quantity of pressure medium demanded is reduced far enough for the transmission pump to be able, within a normal starting time, to produce sufficient pressure for torque transmission in the brakes and/or clutches to be actuated for the starting process. Consequently, in start-stop operation the starting process proceeds without delays perceptible to the driver and thus with the comfort to be expected from an automatic transmission.

BRIEF DESCRIPTION OF THE DRAWINGS

To clarify the invention the description of a drawing of an example embodiment is attached. The single FIGURE shows a section of an automatic transmission with additional pressure spaces for restoring the pistons of shifting elements in this transmission.

DETAILED DESCRIPTION OF THE PREFERRED EMBODIMENTS

In its structure, the transmission can for example correspond to an automatic transmission of planetary design known per se from the 8 HP series manufactured by ZF Friedrichshafen AG. Such a transmission has four gearsets and three wet-running disk clutches and two disk brakes, i.e.

five shifting elements for obtaining gear ratios of the gearsets, of which shifting elements, in any gear two are disengaged and three are engaged. The transmission is equipped with a start-stop function with which, when the vehicle stops, the engine is automatically stopped and when the brake pedal is released or the accelerator pedal is actuated, the internal combustion engine, the transmission and hence also a transmission pump, powered by the internal combustion engine, are automatically re-activated again.

The FIGURE shows the lower half of a longitudinal section through the transmission, with two shifting elements A, B in the form of disk brakes, such that as viewed by the reader, arranged on the left side of the FIGURE are a transmission input with an internal combustion engine (not shown), a hydrodynamic torque converter 1 and a pump 2, for example in the form of a rotary vane pump. The transmission pump 2 driven by the internal combustion engine supplies the shifting elements A, B (and other shifting elements, not shown) with pressure and cooling oil from a hydraulic supply system, not described in any further detail. In a starting gear, i.e. in the first or second gear, the two disk brakes A, B are both engaged. In addition, in the starting gear a clutch (not shown) is also engaged. For the method it is also assumed that when the vehicle stops during start-stop operation the disk brakes A, B relevant for the starting gear and the clutch not shown are engaged, i.e. the starting gear is engaged.

The two disk brakes A, B are arranged inside a transmission housing 3 around a main transmission shaft 4. The first, radially inner disk brake A comprises a disk packet 5 whose inner disks 6 are carried by an inner disk carrier 7 and whose outer disks 8 are carried by an outer disk carrier 9. The disk packet 5 can be actuated by a piston 10 arranged to move axially. On the side of the piston 10 remote from the disk packet 5 is formed an engaging pressure space 11 for the hydraulic actuation of the disk brake A in its engaging direction. A sealing ring 12 seals the engaging pressure space 11 relative to an adjacent wall 13. Opposite the engaging pressure space 11 is formed a rear restoring pressure space 14 in an existing free space area, for restoring the piston. The restoring pressure space 14 is delimited by the piston 10 and a diaphragm plate 15 arranged in a pressure-tight manner. From the restoring pressure space 14 a hydraulic line 19 leads to an inlet 16, through which the restoring pressure space 14 can be pressurized with pressure fluid.

When both pressure spaces 11 and 14 are acted upon by pressure at the same time, axial forces act upon the piston 10 on both sides. By virtue of the functional surfaces 17, 18 on the respective sides of the piston, at a given pressure a force and an opposing force act on the piston 10. The ratio of the functional areas 17, 18 or the functional surfaces 17, 18 is designed such that the resultant force is an engaging force, which exceeds the restoring force by a certain amount. Due to the resulting engaging force, the piston 10 or a pressure element of the piston 10 is pushed against the disk packet 5, whereby the inner and outer disks 6, 8 undergo relative movement and are pressed against one another so that they come into frictional engagement and the disk brake A is engaged. When there is a pressure drop on one side in the engaging pressure space 11, the restoring force becomes dominant so that the piston 10 moves away from the disk packet 5 and is pushed back.

The second, radially outer disk brake B is functionally configured comparably to the first disk brake A. It comprises a disk packet 20 with inner disks 21 and an associated inner disk carrier 22, and outer disks 23 with an associated outer disk carrier 24. To actuate the disk packet 20 there is an axially movable piston 25, on whose side remote from the disk packet 20 is formed a pressure space 26 for the hydraulic actuation of the disk brake 2 in its engaging direction. A sealing ring 27 seals the engaging pressure space 26 relative to an adjacent wall 28. Opposite the engaging pressure space 26 a rear restoring pressure space 29 for restoring the piston is formed in an existing free space area. The restoring pressure space 29 is delimited by the piston 25 and a pressure-tight diaphragm plate 30. From the restoring pressure space 29 a hydraulic line 31 leads to the inlet 16 for supplying the restoring pressure space 29 with hydraulic fluid. The two restoring pressure spaces 14 and 29 are hydraulically connected by the common pressure medium supply 16. Again there are functional surfaces 32 and 33 on the two sides of the piston, whose ratio produces a resultant engaging force of the piston 25 when the two opposed pressure spaces 26, 29 are pressurized at the same time. A first planetary gearset 34 of the automatic transmission is arranged radially inside the disk brake B.

In a method for controlling the two disk brakes A, B described and a clutch (not shown) needed for starting, the clutch similarly being formed with a restoring pressure space and connected to the pressure medium supply 16, the pressure spaces 14, 29 that act against the engaging direction of the respective pistons 10, 25 are permanently pressurized from the common pressure medium supply 16 during normal driving operation by a control unit not described further.

If the start-stop function in the control unit is activated, then if the vehicle stops and already at a time earlier than a pressure drop or pressure cut-off in the engaging pressure spaces 11, 26 when the engine stops, the restoring pressure spaces 14, 29 for restoring the piston are depressurized through the common pressure supply 16. Consequently, no restoring force acts upon the pistons 10, 25 and these remain at rest in their position in contact with the associated disk packets 5, 20. When the internal combustion engine is re-started and the pressure of the transmission pump 2 is built up again, a relatively small volume of pressure fluid produced in a short time during the starting of the engine and delivered to the pistons 10, 25 is sufficient to bring the disk packets 5, 20 back again into frictional engagement and produce the torque transmission required for starting. Thereafter, the restoring pressure spaces 14, 29 can once again be pressurized.

If the start-stop function is not activated, then when the vehicle stops with its engine running the restoring pressure spaces 14, 29 are not depressurized. Thus, when the pressure is cut off on the engaging pressure side each, restoring pressure space 14, 29 performs its proper function as a restoring means for the respective pistons 10 and 25 so that the corresponding shifting elements A, B are fully opened and the force flow in the drive-train is interrupted. Thus, when the engine stops in the start-stop operating mode the restoring pressure spaces 14, 29 are inactive, since in contrast to a mechanical, permanently effective restoring action by spring means, they are promptly depressurized and therefore rendered inactive when the engine stops, but are otherwise active since they are pressurized.

LIST OF INDEXES

1 Torque converter
2 Transmission pump
3 Transmission housing
4 Main transmission shaft
5 Disk packet
6 Inner disks
7 Inner disk carrier
8 Outer disks
9 Outer disk carries 10 Piston
11 Pressure space, engaging pressure space
12 Sealing ring
13 Wall
14 Pressure space, restoring pressure space
15 Diaphragm plate
16 Supply line
17 Functional surface
18 Functional surface
19 Line
20 Disk packet
21 Inner disks
22 Inner disk carrier
23 Outer disks
24 Outer disk carrier
25 Piston
26 Pressure space
27 Sealing ring
28 Wall
29 Pressure space
30 Diaphragm plate
31 Line
32 Functional surface
33 Functional surface
34 Planetary gearset
A Shifting element, shifting brake
B Shifting element, shifting brake

The invention claimed is:

1. A method of activating shifting elements of an automatic transmission with an automatic start-stop function, a pump (2) for supplying the transmission with pressure medium being driven by an internal combustion engine, the shifting elements (A, B), in the form of shifting clutches or shifting brakes, are in each case actuatable by an axially movable piston (10, 25), the piston being acted upon in an engaging direction by pressure within a pressure space (11, 26), and the pressure space (11, 26) acting in the engaging direction of the piston (10, 25) being depressurized when the engine stops, the method comprising the steps of:

at least in each case of the shifting elements (A, B) involved during starting processes, providing an additional pressure space (14, 29) as a restoring means which acts, in opposition to the pressure in the pressure space (11, 26) acting in the engaging direction, and which, when the engine stops and the automatic start-stop function is activated, being depressurized at a time earlier than a pressure drop in the pressure space (11, 26) that acts in the engaging direction of the piston (10, 25), but is otherwise permanently pressurized during driving operation.

2. The method according to claim 1, further comprising the step of arranging the additional pressure spaces (14, 29), for restoring the pistons, axially opposite the pressure spaces (11, 26) that act in the engaging direction for actuating the pistons.

3. The method according to claim 1, further comprising the steps of delimiting the additional pressure spaces (14, 29), for restoring the pistons, by the respective pistons (10, 25), and
associating pressure-tight diaphragm plates (15, 30) with the pistons (10, 25).

4. The method according to claim 1, further comprising the step of hydraulically connecting the additional pressure spaces (14, 29), for restoring the pistons, to one another.

5. The method according to claim 4, further comprising the step of locating a supply-line branching (16, 19, 31), for supplying fluid to the additional pressure spaces (14, 29) hydraulically connected to one another, adjacent to the pressure spaces.

6. The method according to claim 1, further comprising the step of primarily supplying a restoring force for the pistons (10, 25) by way of the pressure medium supplied to the additional pressure spaces (14, 29).

* * * * *